United States Patent [19]

Kaercher, Jr.

[11] 3,758,146

[45] Sept. 11, 1973

[54] GRIPPING DEVICE FOR USE IN LAYING PIPES AND TUBES

[75] Inventor: William C. Kaercher, Jr., Minneapolis, Minn.

[73] Assignee: Jacobsen Manufacturing Company, Racine, Wis.

[22] Filed: Aug. 9, 1971

[21] Appl. No.: 170,044

[52] U.S. Cl............... 294/94, 294/86 R, 294/86.25
[51] Int. Cl. .............................................. B66c 1/56
[58] Field of Search................. 294/86.25, .17, .19, 294/.22, 94, 95, 96, 102, 106; 254/78, 79; 24/68, 71

[56] References Cited
UNITED STATES PATENTS

| 3,485,388 | 12/1969 | Bohne | 294/96 X |
|---|---|---|---|
| 3,201,944 | 8/1965 | Christensen | 61/72.5 |
| 314,563 | 3/1885 | Burton | 294/94 X |

Primary Examiner—Evon C. Blunk
Assistant Examiner—Bruce H. Stoner, Jr.
Attorney—Ralph L. Dugger et al.

[57] ABSTRACT

The gripping device comprises an expansible mandrel mechanism, an over-center toggle mechanism, a coil spring between the mechanisms, and a flexible cable extending through both mechanisms as well as the interposed spring. The mandrel mechanism includes a plurality of resilient jaws, manual actuation of the toggle mechanism into its over-center position causing the cable to pull a cone in a direction to wedge the jaws outwardly against the interior of the pipe or tube to be buried. The toggle mechanism reacts against an adjusting nut so that the amount of cone movement, and hence the amount of jaw expansion, can be altered. The toggle mechanism connects, via a chain, to a mole that is oscillated forwardly and rearwardly to form a tunnel through which the gripping device and the clamped pipe or tube is pulled.

15 Claims, 4 Drawing Figures

INVENTOR.
WILLIAM C. KAERCHER JR.
BY
Dugger, Peterson, Johnson & Westman
ATTORNEYS

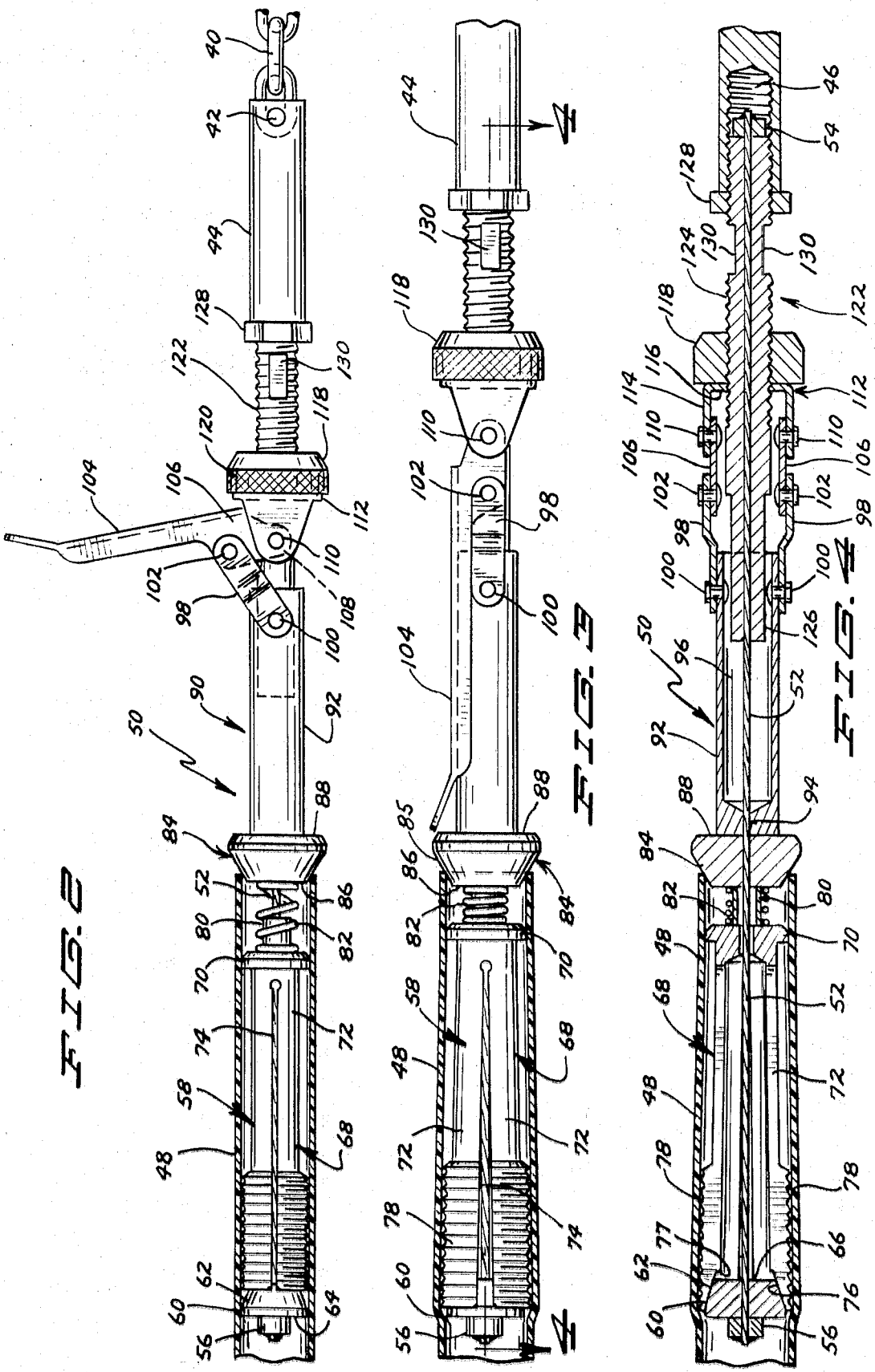

GRIPPING DEVICE FOR USE IN LAYING PIPES AND TUBES

BACKGROUND OF THE INVENTION

1. Field of the Invention

This invention relates generally to pipe and tube laying machines, and pertains more particularly to a device for securely gripping the pipe or tube during the embedding thereof.

2. Description of the Prior Art

My invention will find especial utility when used in conjunction with the oscillating type of machine exemplified in U.S. Pat. No. 3,201,944 granted on Aug. 24, 1965 to Peter N. Christensen titled "Pipe And Cable Laying Machine" and U.S. Pat. No. 3,363,424 granted on Jan. 16, 1968 to William C. Kaercher, Jr. titled "Machine For Burying Flexible Pipes and The Like." Owing to the impact forces developed when operating machines of the foregoing type, the coupling of the mole or tunnel-forming member carried at the lower end of the oscillatory blade on this general type of machine poses serious connecting problems. More specifically, each forward stroke exerts a tensional pull on the pipe or tube which has the objectionable tendency of detaching the coupler from the pipe or tube. Stated somewhat differently, the continual and repetitive yanking or jerking of the coupler creates the separation problem and this problem becomes progressively worse as more and more piping and tubing is embedded, for the inertia and frictional resistance to advancement becomes greater and greater.

Therefore, various attempts have been made to solve this perplexing separation problem. The solution found most satisfactory up to this time has been use of the so-called Chinese finger. This type of coupler is formed of woven steel strands that contract about the forward end of the pipe or tube when subjected to tensional forces. However, the steel strands as they pass through the tunnel formed by the mole are continually subjected to highly abrasive conditions, the degree of abrasion depending upon the type of soil. In any event, though, the Chinese finger ultimately becomes frayed even when optimum soil conditions are encountered and rather quickly frayed when the abrasion is more severe. It will be appreciated that these Chinese fingers are quite costly, the cost increasing with the size of pipe or tube to be laid, and therefore any frequent replacement of them increases the overall operational expenses involved in the burying of pipes and tubes.

SUMMARY OF THE INVENTION

Accordingly, while the Chinese finger has proved generally satisfactory, nonetheless the need still exists for a simple and reliable coupler that will effectively grip a pipe or tube to be embedded and which will also be inexpensive to manufacture and an object of the present invention is to fulfill this need.

Another object of the invention is to provide a gripping device for pipes and tubes that can quickly be attached and detached from the particular pipe or tube.

Another object of the invention is to provide a gripping device that will not inadvertently become disconnected from the pipe or tube being embedded, an aim of the invention being to provide a device that will be self-energizing, the pulling forces causing the gripping jaws to be forced positively outwardly into their clamping engagement.

Also, an object is to accommodate various sizes of pipe and tubing, particularly different sizes of plastic tubing where manufacturing tolerances have not been fully standardized. In this regard, an aim of the invention is to provide a gripping device that can be adjusted to accommodate various diameter sizes.

Still further, an object of the invention is to provide a gripping device that will not injure or damage the pipe or tube to be laid, particularly with respect to applying too great expansive forces against the pipe or tube. It is within the purview of the invention to provide a limiting feature that prevents the device from being used with a pipe or tube that is too small in diameter for the particular device. When larger pipes or tubes are to be pulled, however, certain parts can be interchanged to enable the larger size of pipe or tube to be gripped.

Yet another important object is to provide a gripping device that will permit relatively sharp turns to be negotiated during the embedding operation. More specifically, the invention contemplates a gripping device that will be flexible at one portion thereof so that relatively sharp curves can be traversed, this being particularly desirable when laying irrigation systems beneath lawns in order to facilitate the sprinkling thereof.

Briefly, the invention comprises an over-center toggle mechanism that actuates a mandrel mechanism so as to expand its jaw members outwardly against the interior of the pipe or tube to be laid. An elongated cable extends through the device which enables it to be angularly flexed so that the piping or tubing can be embedded in an undulated or wavy pattern which is especially desirable when laying underground sprinkling systems.

BRIEF DESCRIPTION OF THE DRAWINGS

FIG. 2 is an enlarged side elevational view of the device in its released position;

FIG. 3 is an elevational view corresponding to FIG. 2 with the parts depicted on a slightly larger scale in order to illustrate to better advantage the construction of my device, the gripping device now being illustrated in its clamping position with the plastic pipe or tube appearing in section, and FIG. 4 is a sectional view on the same scale as FIG. 3 with the view being taken in the direction of line 4—4 of this figure.

DESCRIPTION OF THE PREFERRED EMBODIMENT

Figure 1:
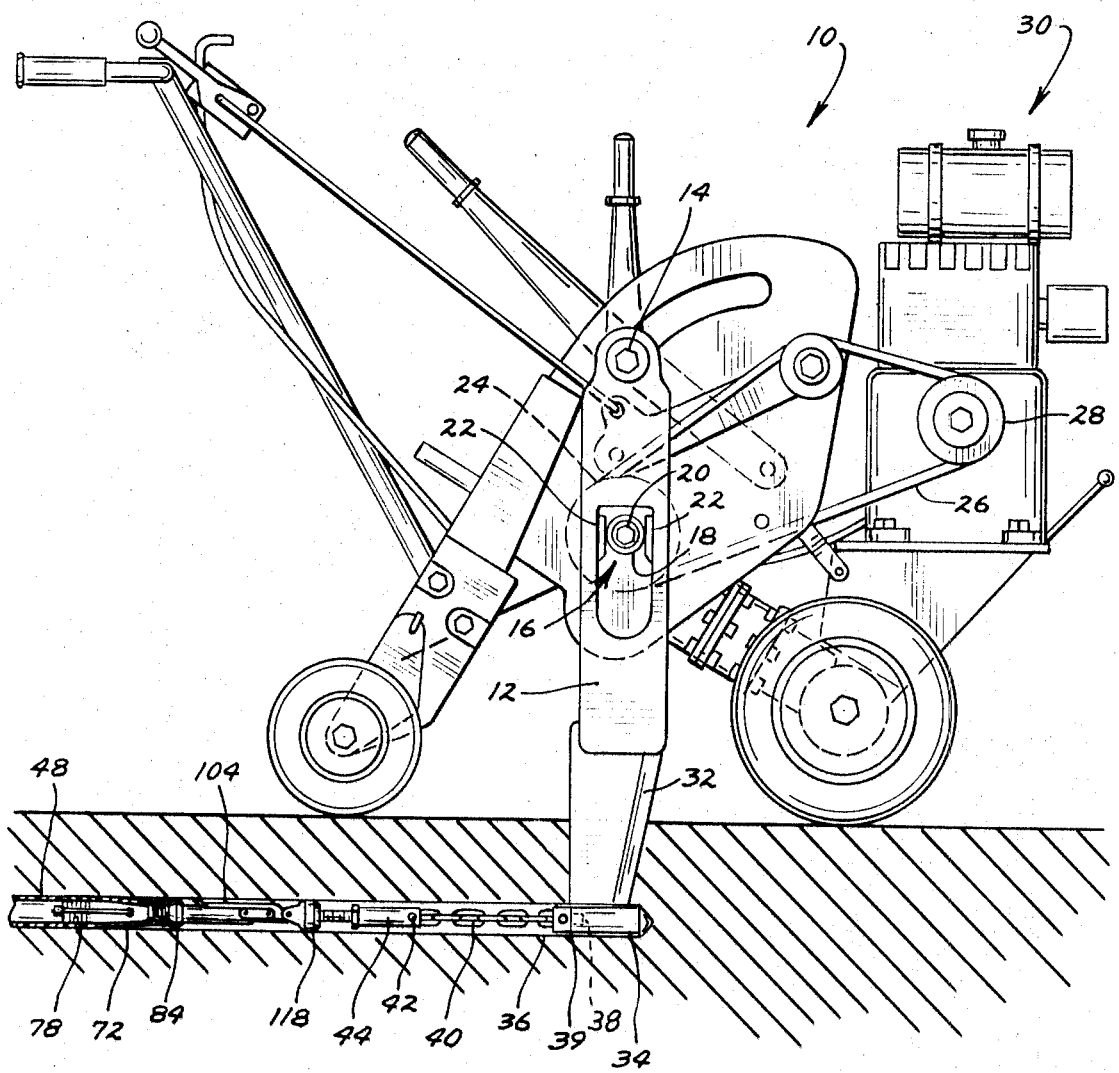
FIG. 1 is a side elevational view of a pipe or tube laying machine with my gripping device in actual use.

Although my gripping device can be used with other types of pipe and tube laying machines than those described in U.S. Pat. Nos. 3,201,944 and 3,363,424, it will be well to describe generally the pipe and tube laying machine of the character set forth in these two patents because of the excessively large shock loads that are applied in the embedding of piping. It might be explained at this initial stage of the description that pipe laying machines of the type illustrated in the two patents, owing to the oscillatory forces they develop, are able to lay a given size of pipe or tube with less power than that required by a non-oscillatory laying machine. However, even with non-oscillatory machines, there is still a problem, although not as severe a one, in maintaining a grip on the pipe or tube and my device can be used with this latter type of machine as well.

While resort can be made to either of the above-identified patents, it might be of benefit to describe generally such a machine. The machines differ somewhat in the two patents that have been mentioned, and it will be discerned that FIG. 1 herein presents the type of machine pictured in my U.S. Pat. No. 3,363,424. The machine has been identified generally by the reference numeral 10 and comprises a pair of arms 12 that oscillate about an adjustable pivot point provided by an axle at 14. An eccentric bearing assembly 16 provides the oscillatory forces which operate the arm 12 forwardly and rearwardly, the assembly including an eccentric 18 on a driven shaft 20. The eccentric 18 rotates between two opposed cam strips 22, being driven through the agency of a pulley 24 mounted on the driven shaft 20. A flexible belt 26 is entrained about the pulley 24 and an additional pulley 28 is mounted on the drive shaft of an internal combustion engine denoted by the reference numeral 30. Extending downwardly from a member extending transversely between the arms 12 is a knife or blade 32 which carries at its lower end a mole or tunnel-forming member 34. Since the machine 10 is only exemplary of the type of machine with which my invention will find utility, further description thereof is not believed to be necessary, particularly inasmuch as resort can be made to either of the foregoing patents if necessary to do so.

While not actually a part of the invention, it will be appreciated that it is necessary to provide a flexible connection to the mole or tunnel-forming member 34. Cooperating in this accomplishment is a clevis connector 36 having threads 38 which are screwed into the mole 34, the mole 34 being tapped for the reception of this connector 36. A transverse pin 39 extends through the connector 36 and also through the foremost link of a chain 40, the foremost link being received in a slot formed in the connector 36. A second transverse pin 42 extends through the rearmost link of the chain 40 and also passes through a clevis connector 44 having internal threads 46.

The pipe or tube to be embedded has only been fragmentarily pictured, it having been given the reference numeral 48. It will be appreciated, though, that this pipe or tube 48 is usually of flexible material and preferably of a suitable plastic such as vinyl.

My gripping device for holding the pipe or tube 48 as it is embedded has been generally indicated by the reference numeral 50. In its exemplary form, it comprises an elongated member in the form of a flexible cable 52 having a tubular cable clamp 54 swaged on the forward end thereof and a similar cable clamp swaged to the rear end of the cable 52.

A mandrel mechanism labeled 58 is disposed immediately forwardly of the rear cable clamp 56, the mechanism 58 including a cone 60 having a tapered outer surface 62 with a relatively large flat end 64 and a smaller flat end 66. It will be understood that the cone 60 has a passage extending therethrough which results in the cone only loosely encircling the cable 52, although it is prevented from moving rearwardly by virtue of the cable clamp 56.

Also included in the construction of the mandrel mechanism 58 is a collet or chuck unit 68 having a collar at 70 which also loosely encircles the cable 52. Projecting rearwardly from the collar 70 are four resilient jaws 72, these jaws being formed by slots 74 extending forwardly to the collar 70. It will be appreciated that the end portions 76 are tapered so as to receive the tapered surface 62 of the cone 60. However, it is planned that the cone 60 be prevented from moving too far forwardly and to accomplish this goal there is a shoulder 77 on each jaw 72. In other words, the tapered end portions 76 extend in each instance to the shoulder 77 and when the cone 60 strikes or is pulled against the shoulder 77, further movement forwardly is precluded. Whereas the inner end portions 76 are tapered, the outer surfaces of these portions are serrated as indicated at 78.

Although the foregoing description has dealt with the construction of the mandrel 58, the device 50 includes additional parts. In this regard, it includes a tubular slug 80 and a coil spring 82 encircling the slug 80. By means of a centering washer or sleeve 84 having a flat face 86 bearing against one end of the coil spring 82, the coil spring 82 is held captive between the centering washer 84 and the collar 70 belonging to the collet unit 68. Not only does the washer 84 center the pipe or tube 48 in loading but it additionally keeps dirt out of the pipe, a tapered surface 85 enabling the open end of different sizes or diameters of tubular members 48 to be closed.

The function of the tubular slug 80 is to prevent the full compression of the coil spring 82. On the other hand, it is highly desirable that the device 50 be angularly flexible in order to negotiate relatively sharp turns when laying the pipe 48. In this regard, it is to be appreciated that the flexibility of the cable 52 is not impaired by the presence of the slug 80, the pivoting or flexing of the device at this particular location still being easily achieved without interference.

The centering washer 84 has a second flat face 88 which bears against an over-center toggle mechanism denoted generally by the reference numeral 90. The mechanism 90 includes a plunger 92 having a relatively small diameter bore portion 94 which is of a size to accommodate the cable 52 and a larger bore portion 96 that extends from the smaller bore portion 94 to the right end of the plunger. Further included in the mechanism 90 are two laterally spaced links 98, there being one at each side of the plunger 92. A first pair of rivets 100 serve to pivot the left or rear ends of the links 98 to the plunger 92, and a second such pair of rivets 102 function to connect in a pivotal manner the other or forward ends of the links 98 to a handle or lever 104. The handle 104 has a U-shape cross section, this configuration resulting in downwardly extending side panels 106 through which the rivets 102 pass or extend. The panels 106 have integral ears 108 and by means of additional rivets 110 extending through these ears 108, the handle 104 is pivotally connected to a U-shaped sheet metal stamping 112. More specifically, the stamping 112 includes ears 114 and a connecting base or bight 116, the rivets 110 actually passing through the ears 114 of the stamping 112.

Rather closely related to the toggle mechanism 90 is a nut 118 having knurled exterior 112 by means of which it can be rotated on a tubular shaft 122. Actually, the nut 118 is engaged with a threaded section 124 on the tubular shaft 122. The left or rear end of the shaft 122 is received within the forward or right end of the bore 96 formed in the plunger 92 of the toggle mechanism 90. As can be discerned from FIG. 3, the sides of the tubular shaft 122 to the left or rear of the threaded section 124 are formed with parallel flats 126.

In this way, any interference with the inner heads of the rivets 100 is obviated.

In order to maintain the clevis connector 44 in a fixed relation on the shaft 122 a lock nut 128 may be employed. Also, provision of flats 130 on the shaft 122 permit the shaft to be either held or rotated with a wrench when making adjustments.

OPERATION

Having presented the foregoing description, the manner in which my gripping device 50 operates in combination with the machine 10 should be readily understood. However, a detailed analysis of the operation should assure even a better appreciation of the benefits to be derived when practicing the invention. Therefore, it can be explained that the serrated ends 78 of the resilient jaws 72 are inserted into the pipe or tube 48. This is done with the handle 104 of the toggle mechanism 90 raised as shown in FIG. 2. Then, the handle 104 is pressed downwardly into the position in which it appears in FIGS. 1 and 3. Although not pictorially understandable from these figures, due to their reduced scale, it will be recognized that the downward rotation of the handle results in the rivets 102 being slightly beneath a line extending between the rivets 100 and 110, which results in what is customarily referred to as an over-center condition.

If the knurled nut 118 is properly positioned on the tubular shaft 122, then the jaws 72 will be expanded or forced outwardly sufficiently to cause the serrations 78 to press against the interior of the pipe or tube 48. Inasmuch as it is planned that different devices 50 be used for tubes of widely varying sizes, the particular device 50 will be intended for use within a certain range of pipe or tube sizes. Therefore, for a given maximum internal diameter of a pipe or tube 48, the shoulders 77 on the resilient jaws 72 will limit the amount of travel that the cone 60 can make in a direction to expand the jaws 72. In other words, the cone 60 can move only a predetermined extent into the collet 68 until the face or flat end 66 strikes the various shoulders 77.

If the nut 118 is not properly positioned on the tubular shaft 122, then an adjustment is necessary. Assuming that the jaws 72 do not sufficiently grip the pipe or tube 48 the nut 118 is rotated so as to move it in the direction of the cone 60. There is thus a reactive force exerted by the threaded rotation of the nut 118 through the threads 124 to force the tubular shaft 122 against the cable clamp 54. Since the cable clamp 54 prevents any actual movement, the result is that the cone 60 is pulled to the right or farther within the collet 68, this being done by reason of the cable clamp 54 acting against the flat end 64 of the cone 60. This can be done with the handle 104 in the position which it assumes in FIG. 1 to produce the relationship of the parts as depicted in FIG. 3, or the handle can be raised to the position pictured in FIG. 2 when adjusting the nut 118.

At this stage, it will be recognized that the coil spring 82 functions as a cushion between the mandrel 58 and the toggle mechanism 90. Any compression of the coil spring 82 causes an initial expansion of the jaws 72 so as to effect a slight initial gripping. The gripping device 50 is self-energizing, for when the cable 52 is forcibly pulled forwardly, as it is done on the forward stroke of the mole 34, then the cone 60, being moved by the cable clamp 56, is pulled farther within the collet 68, being limited however by the shoulders 77 on the jaws 72. Inasmuch as the collar 70 is integral with the jaws 72, it can be moved forwardly or to the right to compress the coil spring 82 but complete compression of the coil spring 82 is prevented by virtue of the tubular slug 80. Consequently, even when the maximum amount of pulling force is transmitted from the mole or tunnel-forming member 34 to the device 50, the device 50 can still bend or flex angularly in the region of the coil spring 82 owing to the flexibility of the cable 52. The slug 80 is relatively short so that a rocking action readily takes place between the ends of the slug 80 and the collar 70 at one end, and the centering washer 84 at the other end.

It will be recognized that the centering washer 84 has a diameter sufficiently large so as to effectively close the open end of the tubular member 48. The tapered surface 85 not only centers the pipe or tube 48 during loading but blocks various sizes of openings against the entrance of dirt as the member 48 is pulled through the ground.

The film retention of the forward end of the pipe or tube 48 on the device 50 resists any inadvertent detachment owing to the shock forces transmitted on the forward stroke of the mole 34. It will be appreciated, it is believed, that the forces are quite appreciable on the forward portion of the travel of the mole or tunnel-forming member 34. Any such forces are transmitted in a direction to tend to expand the jaws 72 against the interior of the pipe or tube 48, such forces being transmitted through the cable 52 and the cone 60 that is held captive thereon by the rear cable clamp 56.

When the section of pipe or tube 48 has been buried, then the handle 104 is manually shifted back to the raised position in which it appears in FIG. 2. This releases the grip, because the cone 60 no longer is pulled tightly against the ends 76 of the jaws 72. In other words, the slack in the cable 52 relaxes the gripping action, and the serrations 78 move inwardly to allow the jaws to be extracted from the pipe or tube 48.

I claim:

1. A gripping device for use in burying a tubular member comprising a flexible cable, an outwardly expandable first mechanism connected to said flexible cable at one location thereon and actuatable by movement of said cable in one direction to expand sufficiently to clamp against the interior of the member to be buried, and a second mechanism connected to said flexible cable at a location thereon spaced from said one location for pulling said flexible cable in said one direction to cause expansion and clamping of said first mechanism against said member, whereby that portion of the cable extending between said first and second mechanisms permits said mechanisms to flex angularly relative to each other.

2. A gripping device in accordance with claim 1 including resilient means encircling said flexible cable at a location between said mechanisms.

3. A gripping device in accordance with claim 2 including a first cable clamp for engaging said first mechanism and a second cable clamp for engaging said second mechanism.

4. A gripping device in accordance with claim 3 in which said second mechanism is an over-center mechanism.

5. A gripping device in accordance with claim 4 including a threaded shaft encircling one portion of said cable, and a nut threaded on said threaded shaft portion for positioning said over-center mechanism with respect to said first mechanism.

6. A gripping device in accordance with claim 5 including a coil spring encircling said cable at a location between said mechanisms.

7. A gripping device in accordance with claim 6 including a tubular slug innerjacent said coil spring and circumjacent the portion of said cable extending therethrough.

8. A gripping device in accordance with claim 7 in which said over-center mechanism includes a plunger having a bore therein, one end of said threaded shaft being received in said bore, a pair of links, means pivotally connecting one end of said links to the end of said plunger receiving said threaded shaft, a handle, means pivotally connecting the opposite ends of said links to said handle, a U-shaped sheet metal stamping, means pivotally connecting said handle to said U-shaped stamping, said nut bearing against said U-shaped stamping so as to position said over-center mechanism with respect to said first-mentioned mechanisms.

9. A gripping device in accordance with claim 8 in which the received end of said shaft has a pair of flats, and said pivoting means includes a pair of rivets, each rivet extending through one of said links and the plunger into said bore, the flats on said received ends permitting movement of said rivets without interference relative the received end of said shaft.

10. A device in accordance with claim 1 in which said first mechanism includes a plurality of resilient jaws and a cone for urging said jaws outwardly into clamping engagement when said flexible cable is pulled by said second mechanism in said one direction.

11. A gripping device in accordance with claim 10 in which said resilient jaws each have a shoulder therein for limiting the amount of movement of said cone in a direction toward said second mechanism and thereby restrict the amount of expansion of the free ends of said jaws, a collar encircling said flexible cable and having the other ends of said jaw members integral therewith, said collar having a diameter generally corresponding to that of said cone so as to also be received within said tubular member to be buried.

12. A gripping device in accordance with claim 1 including a non-resilient centering washer encircling said flexible cable at a location intermediate said mechanisms for closing the open end of the tubular member to be buried.

13. A gripping device in accordance with claim 12 in which said centering washer has a tapered surface for engaging the open end of the tubular member to be buried.

14. A gripping device in accordance with claim 13 in which said centering washer has flat ends, one flat end bearing against said second mechanism, the device further including a coil spring encircling said flexible cable having one end thereof engaging the other flat end of said centering washer and its opposite end bearing against said first mechanism.

15. A gripping device in accordance with claim 14 including a tubular slug innerjacent said coil spring and circumjacent said cable, said slug having a length less than the uncompressed length of said coil spring.

* * * * *